US012576843B2

(12) United States Patent　　　　(10) Patent No.:　US 12,576,843 B2
Watanabe　　　　　　　　　　　　　　(45) Date of Patent:　Mar. 17, 2026

(54) DRIVING ASSISTANCE APPARATUS AND DRIVING ASSISTANCE METHOD

(71) Applicant: Hitachi Astemo, Ltd., Hitachinaka (JP)

(72) Inventor: Seiji Watanabe, Ibaraki (JP)

(73) Assignee: Hitachi Astemo, Ltd., Hitachinaka (JP)

(*) Notice: Subject to any disclaimer, the term of this patent is extended or adjusted under 35 U.S.C. 154(b) by 168 days.

(21) Appl. No.: 18/561,261

(22) PCT Filed: Feb. 8, 2022

(86) PCT No.: PCT/JP2022/004979
§ 371 (c)(1),
(2) Date: Nov. 15, 2023

(87) PCT Pub. No.: WO2023/013107
PCT Pub. Date: Feb. 9, 2023

(65) Prior Publication Data
US 2024/0253629 A1　　　Aug. 1, 2024

(30) Foreign Application Priority Data

Aug. 6, 2021　(JP) ................................. 2021-129526

(51) Int. Cl.
B60W 30/16　　　(2020.01)
H04W 4/46　　　(2018.01)
(52) U.S. Cl.
CPC .............. B60W 30/16 (2013.01); H04W 4/46 (2018.02); B60W 2554/402 (2020.02); B60W 2554/80 (2020.02); B60W 2556/65 (2020.02)
(58) Field of Classification Search
CPC ..... H04W 4/44; H04W 4/46; B60W 2554/80; B60W 2554/802; B60W 2556/65; B60W 50/14; B62D 15/0255; B62D 15/026
See application file for complete search history.

(56) References Cited

U.S. PATENT DOCUMENTS

| | | | |
|---|---|---|---|
| 2018/0157272 A1 | 6/2018 | Suzuki | |
| 2020/0398840 A1* | 12/2020 | Kurihara | ................ G08G 1/167 |
| 2021/0031767 A1* | 2/2021 | Kim | ........................ B60Q 1/507 |
| 2021/0319701 A1* | 10/2021 | Mishima | .......... G08G 1/096725 |

FOREIGN PATENT DOCUMENTS

| | | | | |
|---|---|---|---|---|
| JP | 2014078170 A | * | 5/2014 | ........... B60W 40/06 |
| JP | 2015-044432 A | | 3/2015 | |
| JP | 2016-224867 A | | 12/2016 | |
| JP | 2020035155 A | * | 3/2020 | |

OTHER PUBLICATIONS

International Search Report with English Translation of International Patent Application No. PCT/JP2022/004979 dated Apr. 19, 2022 (5 pages).

* cited by examiner

*Primary Examiner* — Fadey S. Jabr
*Assistant Examiner* — Mario C Gonzalez
(74) *Attorney, Agent, or Firm* — Foley & Lardner LLP

(57)　　　　　ABSTRACT

A driving assistance apparatus includes: a communication function detection unit that detects whether or not a surrounding vehicle is equipped with a communication function; a surrounding vehicle information acquisition unit that acquires a relative distance between the host vehicle and a surrounding vehicle equipped with the communication function on the basis of information acquired from the surrounding vehicle equipped with the communication function; and a manually driven vehicle estimation unit that estimates whether or not a manually driven vehicle is present around the host vehicle.

6 Claims, 4 Drawing Sheets

DRIVING ASSISTANCE APPARATUS AND DRIVING ASSISTANCE METHOD

INCORPORATION BY REFERENCE

This application claims the benefit of priority of the prior Japanese Patent Application No. 2021-129526, filed on Aug. 6, 2021, the entire contents of which are incorporated herein by reference.

TECHNICAL FIELD

The present invention relates to a driving assistance apparatus and a driving assistance method for determining a manually driven vehicle by using vehicle-to-vehicle communication.

BACKGROUND ART

With the spread of autonomous driving, it is expected that an autonomous vehicle and a manually driven vehicle are mixed on a road. In a situation where an autonomous vehicle and a manually driven vehicle are mixed on a road, the autonomous vehicle detects the manually driven vehicle by using sensing information of a camera or the like.

Background art of the present technical field includes the following prior art. PTL 1 (JP 2020-35155 A) discloses a travel control apparatus including a communication unit, a control unit, and a storage unit, in which the control unit includes a detection unit, a travel control unit, and a notification unit, the detection unit detects a manually driven car existing around an autonomous car, the travel control unit controls travel of the autonomous car so as to support travel of the manually driven car in a case where the manually driven car is detected by the detection unit, and the notification unit notifies the manually driven car of support information related to support.

SUMMARY OF INVENTION

Technical Problem

However, since the autonomous vehicle is controlled to maintain a constant inter-vehicle distance, there is a case where the autonomous vehicle disturbs travel of the manually driven vehicle traveling around without considering the intention of the driving operation of a driver of the manually driven vehicle. As a result, there is a possibility that forcible lane change by the manually driven vehicle is induced, and sudden braking of the autonomous vehicle occurs. In addition, it is difficult to accurately recognize the manually driven vehicle in bad weather or at night by detecting a surrounding situation by sensing using a camera or the like.

Solution to Problem

A representative example of the invention disclosed in the present application is as follows. That is, a driving assistance apparatus includes: a communication function detection unit that detects whether or not a surrounding vehicle is equipped with a communication function; a surrounding vehicle information acquisition unit that acquires a relative distance between the host vehicle and a surrounding vehicle equipped with the communication function on the basis of information acquired from the surrounding vehicle equipped with the communication function; and a manually driven vehicle estimation unit that estimates whether or not a manually driven vehicle is present around the host vehicle.

Advantageous Effects of Invention

According to one aspect of the present invention, it is possible to accurately determine the presence of a manually driven vehicle. Problems, configurations, and effects other than those described above will be apparent from the following description of the embodiment below.

DESCRIPTION OF EMBODIMENTS

Hereinafter, an embodiment according to the present invention will be described.

Figure 1:
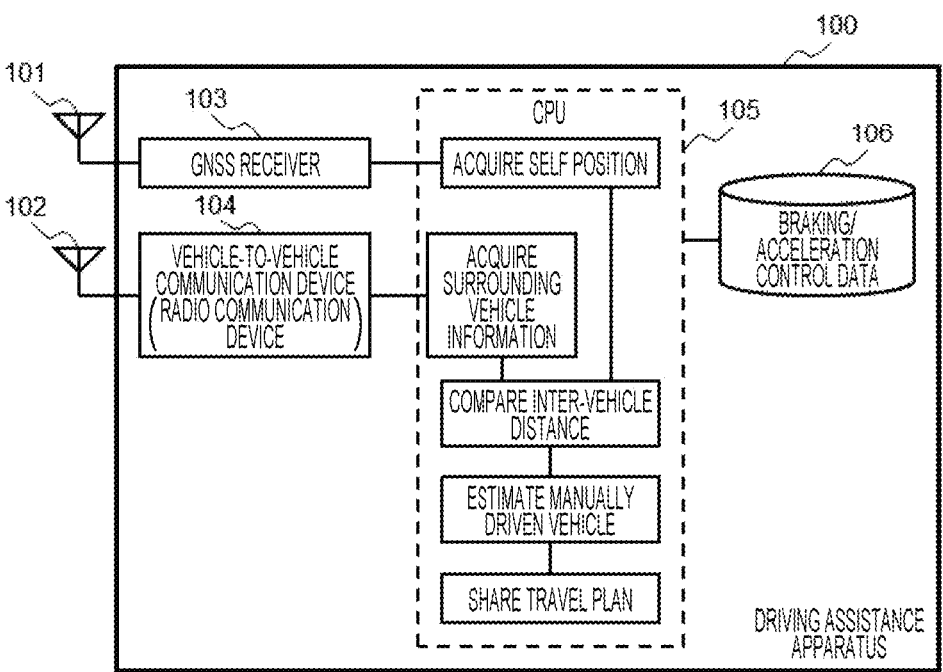
FIG. 1 is a diagram illustrating a configuration of a driving assistance apparatus.

FIG. 1 is a diagram illustrating a configuration of a driving assistance apparatus 100 of the present embodiment.

The driving assistance apparatus 100 of the present embodiment includes a GNSS receiver 103 that receives an RF signal from a GNSS antenna 101, and a V2X transceiver 104 that receives an RF signal from a V2X antenna 102. Using the GNSS receiver 103 and the V2X transceiver 104, the driving assistance apparatus 100 can acquire latitude-longitude information of a host vehicle and latitude-longitude information of a vehicle traveling around and equipped with a V2X transceiver. V2X is a generic term for vehicle to vehicle (V2V: vehicle-to-vehicle communication), vehicle to infrastructure (V2I: road-to-vehicle communication), and vehicle to pedestrian (V2P: pedestrian-to-vehicle communication). In the embodiment, the latitude-longitude information of the host vehicle acquired by the GNSS receiver 103 and the latitude-longitude information of the neighboring vehicle acquired by the V2X transceiver 104 are input to a CPU 105, and the inter-vehicle distance between the host vehicle and the surrounding vehicle is calculated.

The CPU 105 recognizes a manually driven vehicle not equipped with V2X communication function by performing comparison of the calculated inter-vehicle distances, adjusts the speed of the host vehicle so as not to disturb travel of the manually driven vehicle, and generates braking/acceleration data 106 for performing braking/acceleration control so as to keep the inter-vehicle distance between the host vehicle and the preceding vehicle at a certain value or more.

The CPU 105 is an arithmetic device that executes a program stored in a memory (not illustrated). The CPU 105 executes the program to operate as a functional unit (self-position acquisition unit, surrounding vehicle information acquisition unit, inter-vehicle distance comparison unit, manually driven vehicle recognition unit, travel plan sharing unit) that provides predetermined functions.

Figure 2:
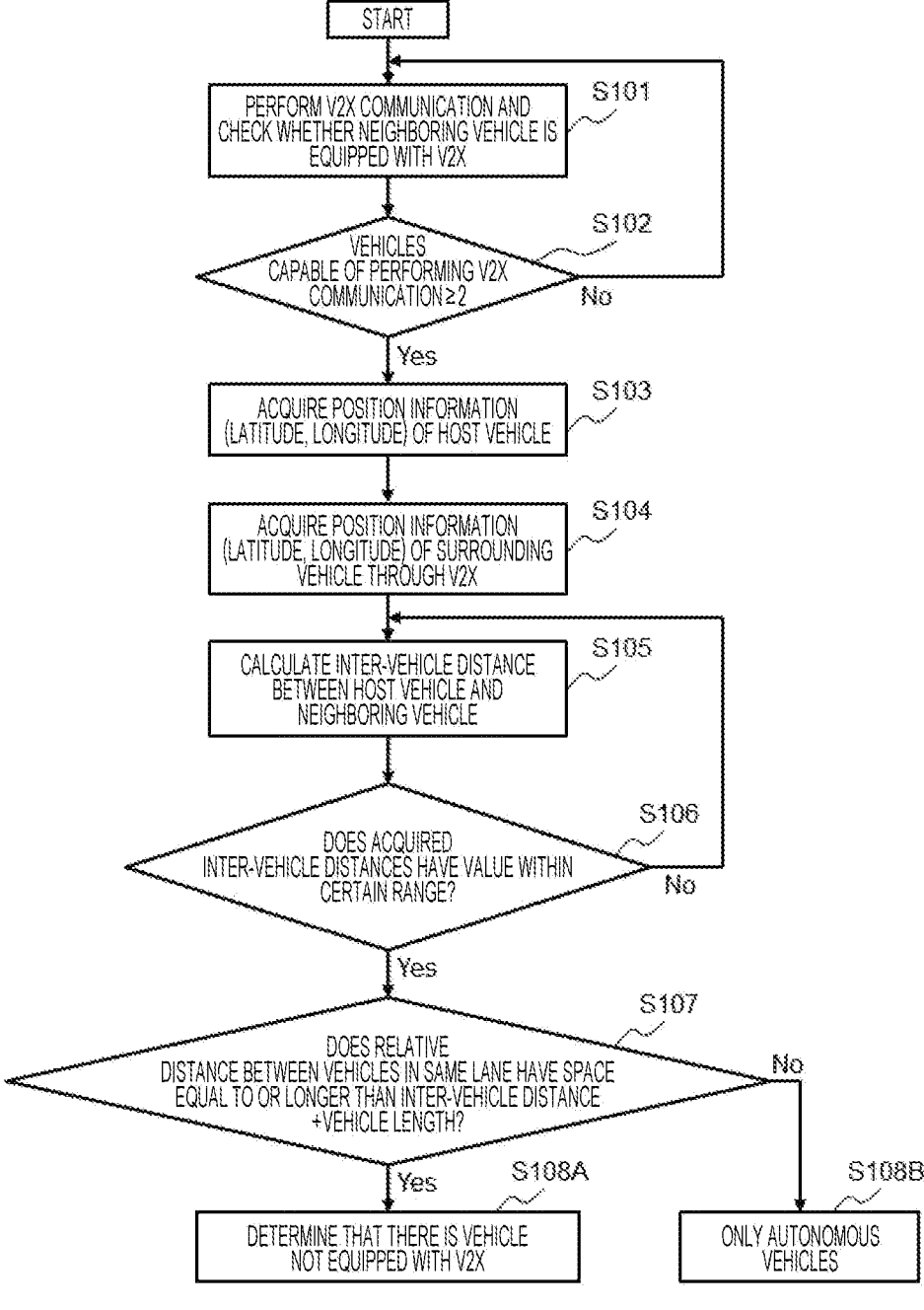
FIG. 2 is a flowchart of a manually driven vehicle detection process.

FIG. 2 is a flowchart of a manually driven vehicle detection process executed by the driving assistance apparatus 100 of the present embodiment.

Step S101: In manually driven vehicle detection, first, the surrounding vehicle information acquisition unit determines whether or not a neighboring vehicle of the host vehicle is equipped with V2X communication function depending on whether or not the neighboring vehicle is performing V2X communication, and checks the number of vehicles capable of performing vehicle-to-vehicle communication.

Step S102: In a case where the surrounding vehicle information acquisition unit determines that two or more vehicles capable of performing vehicle-to-vehicle communication exist around the host vehicle, the process proceeds to step S103. In contrast, in a case where the surrounding vehicle information acquisition unit determines that the number of vehicles capable of performing vehicle-to-vehicle communication is one or less around the host vehicle, the process returns to step S101, and the surrounding vehicle information acquisition unit checks the vehicle equipped with V2X around the host vehicle.

Step S103: The self-position acquisition unit acquires latitude-longitude information of the host vehicle 200 from the GNSS receiver 103.

Step S104: The surrounding vehicle information acquisition unit acquires, from the V2X transceiver 104, latitude-longitude information of autonomous vehicles traveling around the host vehicle 200 and equipped with the V2X transceiver, such as vehicles 201 to 203 in FIG. 4.

Step S105: The inter-vehicle distance comparison unit calculates the distances between the vehicles capable of performing communication from the acquired latitude-longitude information of the host vehicle 200 and the latitude-longitude information of the neighboring vehicles 201 to 203.

Step S106: The inter-vehicle distance comparison unit determines whether or not each of the calculated inter-vehicle distances has a value within a certain range. Then, if the inter-vehicle distance is longer than a predetermined threshold, it is not possible to determine whether the vehicle is an autonomous vehicle or a manually driven vehicle. Therefore, the inter-vehicle distance between the host vehicle and the neighboring vehicle is repeatedly calculated until the inter-vehicle distance falls within the certain range. In contrast, if the inter-vehicle distance falls within the certain range, the calculated inter-vehicle distance is compared in step S107. The inter-vehicle distance calculated in step S106 is an inter-vehicle distance between vehicles traveling in the same lane, and is, for example, an inter-vehicle distance between the preceding neighboring vehicle 201 in front of the host vehicle and the host vehicle 200 and an inter-vehicle distance between the vehicle 202 traveling in front in the left lane and the vehicle 203 traveling behind in the same lane, illustrated in FIG. 4.

Step S107: The manually driven vehicle recognition unit compares the relative distance between the vehicles traveling in the same lane with a predetermined threshold, and determines whether or not the relative distance is equal to or longer than a length obtained by adding the vehicle length to a standard inter-vehicle distance of the autonomous vehicle. Note that the inter-vehicle distance in autonomous driving control is represented by the distance between the front portion of the host vehicle and the rear portion of the vehicle ahead, and the inter-vehicle distance calculated from the positions of the vehicles is represented by the distance between the vehicle center position of the host vehicle and the vehicle center position of the vehicle ahead. Therefore, a length obtained by adding the vehicle length to the standard inter-vehicle distance in automatic driving control is used as the threshold. In addition, the standard inter-vehicle distance of the autonomous vehicle may be a constant value, or may be a value that changes depending on the speed. The vehicle length may be a vehicle length of the host vehicle, or may be a vehicle length of a surrounding vehicle that can be acquired by V2X communication.

Step S108A: In a case where it is determined in step S107 that the calculated inter-vehicle distance is equal to or longer than the length obtained by adding the vehicle length to the standard inter-vehicle distance of the autonomous vehicle, the manually driven vehicle recognition unit determines that there is a vehicle not equipped with a V2X communication function or a manually driven vehicle 204 at a place with the large inter-vehicle distance. For example, since a relative distance 206 between the vehicle 202 and the vehicle 203 traveling in the left lane is longer than the predetermined threshold (length obtained by adding the vehicle length to the standard inter-vehicle distance of the autonomous vehicle), it is determined that the manually driven vehicle 204 exists.

Step S108B: In a case where it is determined in step S107 that the calculated inter-vehicle distance is not equal to or longer than the length obtained by adding the vehicle length to the standard inter-vehicle distance of the autonomous vehicle, the manually driven vehicle recognition unit determines that only autonomous vehicles equipped with the V2X communication function are traveling as the neighboring vehicles. For example, since a relative distance 205 between the vehicle 201 and the vehicle 200 traveling in a center lane is shorter than the predetermined threshold (length obtained by adding the vehicle length to the standard inter-vehicle distance of the autonomous vehicle), it is determined that the manually driven vehicle 204 does not exist between the vehicle 201 and the vehicle 200.

Figure 3:
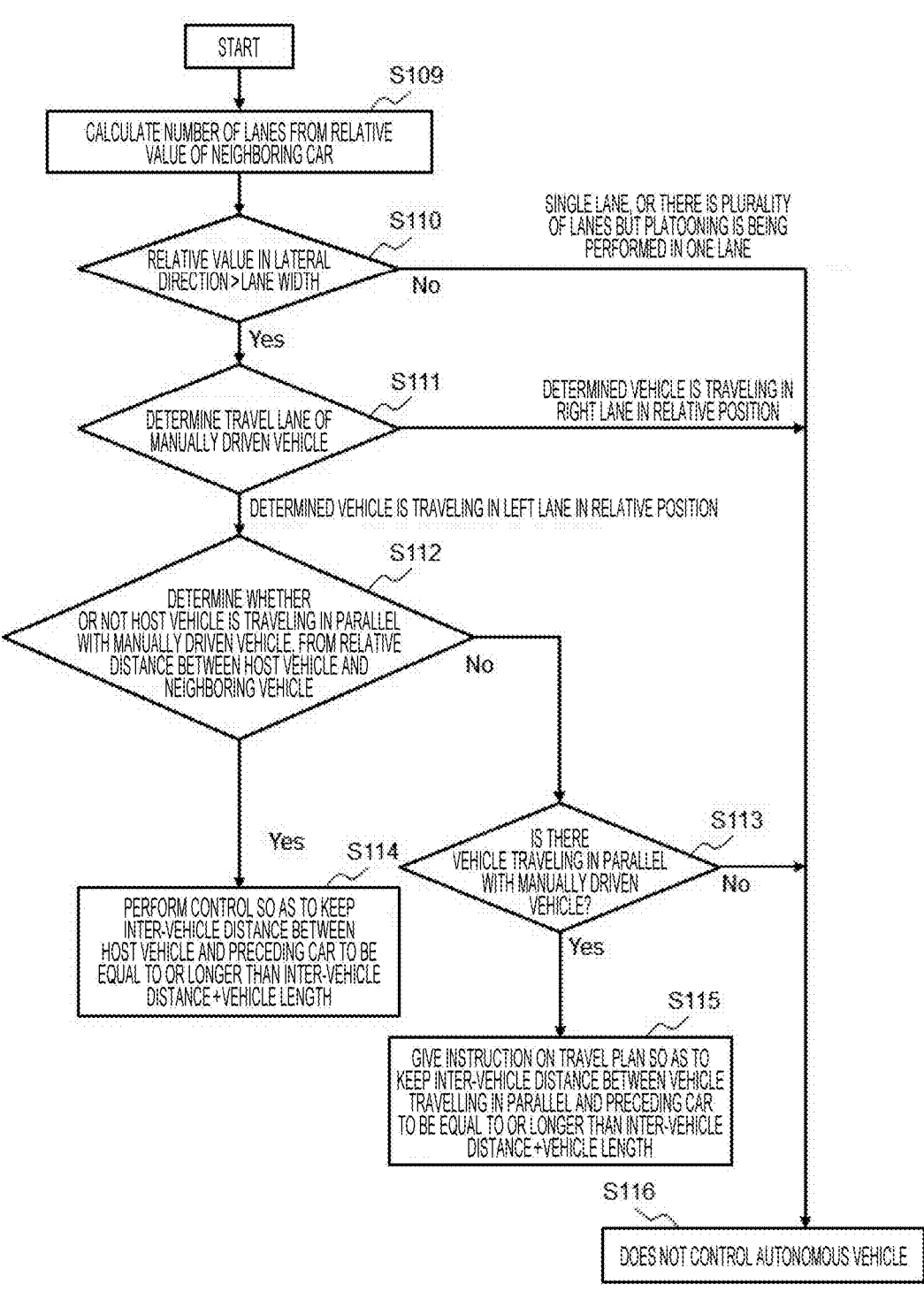
FIG. 3 is a flowchart of a braking/acceleration control process.

FIG. 3 is a flowchart of a braking/acceleration control process executed by the driving assistance apparatus 100 of the present embodiment. In the braking/acceleration control process illustrated in FIG. 3, the degree of freedom of travel of the detected manually driven vehicle is increased.

Figure 4:
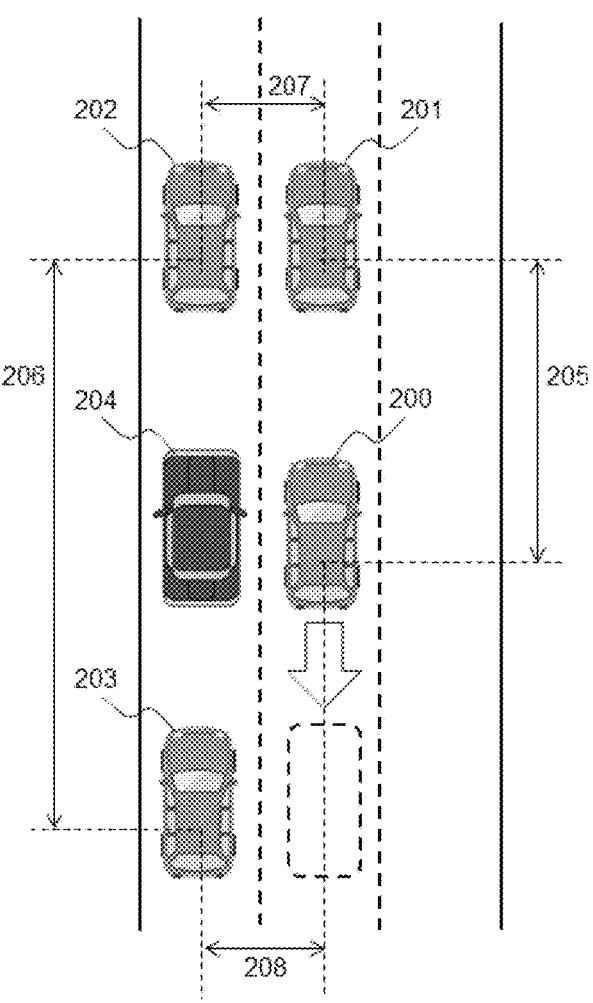
FIG. 4 is a diagram illustrating braking/acceleration control.

Step S109: First, the travel plan sharing unit calculates the number of lanes of the road on which the vehicle is traveling from inter-vehicle distance information. In step S109, as illustrated in FIG. 4, an inter-vehicle distance 207 between the vehicle 202 traveling in the left lane and the vehicle 201 traveling in the center lane and an inter-vehicle distance 208 between the vehicle 203 traveling in the left lane and the host vehicle 200 are used. The number of lanes and the lane width are calculated by estimating a vehicle parallel traveling state from the inter-vehicle distances by using integral multiples of a value (for example, 3.2 to 3.6 m) determined on the basis of a predetermined lane width determined in the road structure example as thresholds. Note that in a case where a high precision map is available, the number of lanes and the lane width may be acquired from the high precision map.

Step S110: The travel plan sharing unit determines whether or not the relative distance to an adjacent vehicle in the lateral direction orthogonal to the traveling direction of the vehicle is larger than the lane width. If the relative distance to the adjacent vehicle in the lateral direction is equal to or less than the lane width, it is determined that there is a single lane or there is a plurality of lanes but platooning is being performed in the same lane, and the host vehicle 200 does not perform the braking/acceleration control (S116).

Step S111: If it is determined in step S110 that the relative distance to the adjacent vehicle in the lateral direction is larger than the lane width, the travel plan sharing unit determines the travel lane of the detected manually driven vehicle 204. For example, the lane in which the manually driven vehicle 204 is traveling can be determined from the number of lanes calculated in step S109 and the positional relationship of the detected manually driven vehicle 204. In addition, it may be estimated that the manually driven vehicle 204 exists at a place where the inter-vehicle distance of the autonomous vehicle is long. In a case where it is determined that the detected manually driven vehicle 204 is traveling in the right lane relative to the host vehicle 200, the manually driven vehicle 204 can freely change the lane to the overtaking lane. Therefore, the host vehicle 200 does not perform the braking/acceleration control (S116).

Step S112: If it is determined in step S111 that the detected manually driven vehicle 204 is traveling in the left lane relative to the host vehicle 200, the travel plan sharing unit determines that the manually driven vehicle 204 and the host vehicle 200 are traveling in parallel in a case where it is determined that the manually driven vehicle 204 is traveling between the vehicle 202 and the vehicle 203 from the relationship of the relative distances between the host vehicle 200 and the vehicle 202 traveling in front in the left lane and the vehicle 203 traveling behind in the same lane. In a case where the host vehicle 200 is traveling in parallel with the manually driven vehicle 204, in order to prompt the manually driven vehicle 204 to leave from the line of the autonomous vehicles and cause the autonomous vehicles to travel together, the travel plan sharing unit generates braking/acceleration data 106 that increases the inter-vehicle distance between the host vehicle 200 and the preceding vehicle 201 to the same extent as the detected inter-vehicle distance between the front and rear vehicles of the detected manually driven vehicle 204 and transmits the braking/acceleration data 106 to a driving control apparatus to perform the braking/acceleration control (S114). Note that the inter-vehicle distance between the host vehicle 200 and the following vehicle may be increased without increasing the inter-vehicle distance between the host vehicle 200 and the preceding vehicle 201. In this case, since the inter-vehicle distance between the following vehicle and the host vehicle 200 is increased, it is necessary to transmit a driving plan according to the acceleration/braking control data of the host vehicle 200 to the following vehicle through the V2X communication device 104 and to cooperate with the following vehicle on the basis of the driving plan.

Step S113: If it is determined in step S112 that the manually driven vehicle 204 and the host vehicle 200 are not traveling in parallel, the travel plan sharing unit determines whether or not there is another surrounding vehicle traveling in parallel with the manually driven vehicle 204 without performing the braking/acceleration control of the host vehicle 200. In a case where there is a surrounding vehicle traveling in parallel with the manually driven vehicle 204, a travel plan for making the inter-vehicle distance between the surrounding vehicle and the preceding vehicle same as the inter-vehicle distance between the front and rear vehicles of the detected manually driven vehicle 204 is instructed to the surrounding vehicle (S115). As a result, the surrounding vehicle goes backward, lane change of the manually driven vehicle 204 to the right lane is made possible, and it is possible to prompt the manually driven vehicle 204 to leave the line of the autonomous vehicles and cause the autonomous vehicles to travel together. Furthermore, forcible lane change of the manually driven vehicle 204 can be prevented.

As described above, the driving assistance apparatus 100 of the present embodiment includes: the communication function detection unit that detects whether or not a communication function is installed in a surrounding vehicle; the surrounding vehicle information acquisition unit that acquires a relative distance between the host vehicle and a surrounding vehicle in which the communication function is installed on the basis of information acquired from the surrounding vehicle in which the communication function is installed; and the manually driven vehicle estimation unit that estimates whether or not a manually driven vehicle is present around the host vehicle. Therefore, the presence of the manually driven vehicle can be accurately determined by using V2X communication.

In addition, the manually driven vehicle estimation unit estimates the presence of the manually driven vehicle on the basis of the relative distance between the host vehicle and the surrounding vehicle. Therefore, it is possible to accurately determine the presence of a manually driven vehicle in various environments such as when camera fails, when visibility is poor, and a case where the host vehicle is surrounded by large vehicles.

In addition, the driving assistance apparatus 100 further includes the travel plan sharing unit that outputs braking/acceleration data that increases the inter-vehicle distance between the host vehicle and the vehicle traveling in front of or behind the host vehicle in a case where the relative distance between the host vehicle and the vehicle traveling in front of or behind the host vehicle is shorter than the relative distance between a first autonomous vehicle and a second autonomous vehicle. Therefore, by increasing the inter-vehicle distance with the car ahead, it is possible to guide the manually driven vehicle to change lanes without disturbing free travel of the manually driven vehicle.

In addition, the travel plan sharing unit shares the travel plan according to the output braking/acceleration data with the surrounding vehicles through the communication function. Therefore, it is possible to realize safe travel by platooning in which the autonomous vehicles are gathered by prompting the manually driven vehicle to leave the line of the autonomous vehicles.

In addition, the driving assistance apparatus 100 further includes the travel plan sharing unit that outputs, in a case where there is a vehicle traveling in parallel with the manually driven vehicle, the travel plan for increasing the inter-vehicle distance between the vehicle traveling in parallel and the vehicle traveling in front of or behind the vehicle traveling in parallel. Therefore, it is possible to realize safe travel by platooning in which the autonomous vehicles are gathered by prompting the manually driven vehicle to leave the line of the autonomous vehicles.

Note that the present invention is not limited to the above-described embodiment, and includes various modifications and equivalent configurations within the spirit of the appended claims. For example, the above-described embodiment is described in detail for easy understanding of the present invention, and the present invention is not necessarily limited to those having all the configurations described above. In addition, part of the configuration of one embodiment may be replaced with the configuration of another embodiment. Furthermore, the configuration of another embodiment may be added to the configuration of a certain embodiment. Moreover, it is possible to add, delete, or replace another configuration to, from, or with part of the configuration of each embodiment.

In addition, part or all of the above-described configurations, functions, processing units, processing means, and the like may be realized by hardware by, for example, designing with an integrated circuit, or may be realized by software by a processor interpreting and executing a program for realizing each function.

Information of a program, a table, a file, or the like that realizes each function can be stored in a storage device such as a memory, a hard disk, an SSD (Solid State Drive), or a recording medium such as an IC card, an SD card, or a DVD.

Furthermore, control lines and information lines indicate those considered necessary for the description, and do not necessarily indicate all the control lines and information lines necessary for implementation. In fact, it can be considered that almost all components are interconnected.

The invention claimed is:

1. A driving assistance apparatus, comprising one or more memory devices having a program stored thereon that, when executed by one or more processors, causes the one or more processors to:

detect whether or not a surrounding vehicle is equipped with a communication function;

acquire a relative distance between a host vehicle and the surrounding vehicle equipped with the communication function on a basis of information acquired from the surrounding vehicle equipped with the communication function;

estimate whether or not a manually driven vehicle is present around the host vehicle;

estimate that the manually driven vehicle is present between a first autonomous vehicle and a second autonomous vehicle, in a case where an inter-vehicle distance between the first autonomous vehicle and the second autonomous vehicle is longer than a predetermined distance;

output braking/acceleration data that causes the host vehicle travelling in parallel with the manually driven vehicle or a vehicle that travels in front of or behind the host vehicle to increase the inter-vehicle distance with a preceding vehicle in a case where a relative distance between the host vehicle and the vehicle that travels in front of or behind the host vehicle is shorter than a relative distance between the first autonomous vehicle and the second autonomous vehicle; and prompt the manually driven vehicle to make a lane change in response to an increase in the inter-vehicle distance between the host vehicle and the preceding vehicle.

2. The driving assistance apparatus according to claim 1, wherein the one or more processors are further configured to estimate presence of the manually driven vehicle on a basis of the relative distance between the host vehicle and the surrounding vehicle.

3. The driving assistance apparatus according to claim 2, wherein the one or more processors are further configured to compare a relative distance between the host vehicle and a vehicle that travels in front of or behind the host vehicle with a relative distance between the first autonomous vehicle and the second autonomous vehicle, on a basis of information acquired by the one or more processors, in a case where the one or more processors estimate that the manually driven vehicle is present in either a left or right lane direction of the host vehicle.

4. The driving assistance apparatus according to claim 1, wherein the one or more processors are further configured to share a travel plan according to the output braking/acceleration data with the surrounding vehicle through the communication function.

5. The driving assistance apparatus according to claim 1, wherein the one or more processors are further configured to output, in a case where there is a vehicle that travels in parallel with the manually driven vehicle, a travel plan for increasing an inter-vehicle distance between the vehicle that travels in parallel and a vehicle that travels in front of or behind the vehicle that travels in parallel.

6. A driving assistance method executed by a driving assistance apparatus, the driving assistance apparatus including an arithmetic device that executes predetermined processing and a storage device connected to the arithmetic device, the method comprising:

detecting whether or not a surrounding vehicle is equipped with a communication function;

acquiring a relative distance between a host vehicle and the surrounding vehicle equipped with the communication function on a basis of information acquired from the surrounding vehicle equipped with the communication function;

estimating whether or not a manually driven vehicle is present around the host vehicle;

estimating that the manually driven vehicle is present between a first autonomous vehicle and a second autonomous vehicle, in a case where and inter-vehicle distance between the first autonomous vehicle and the second autonomous vehicle is longer than a predetermined distance;

outputting braking/acceleration data that causes the host vehicle travelling in parallel with the manually driven vehicle or a vehicle that travels in front of or behind the host vehicle to increase an inter-vehicle distance with a preceding vehicle in a case where a relative distance between the host vehicle and the vehicle that travels in front of or behind the host vehicle is shorter than a relative distance between the first autonomous vehicle and the second autonomous vehicle; and prompting the manually driven vehicle to make a lane change in response to an increase in the inter-vehicle distance between the host vehicle and the preceding vehicle.

\* \* \* \* \*